US012739499B2

(12) United States Patent
Kosaka et al.

(10) Patent No.: US 12,739,499 B2
(45) Date of Patent: Sep. 15, 2026

(54) INFORMATION PROCESSING DEVICE

(71) Applicant: TOYOTA JIDOSHA KABUSHIKI KAISHA, Toyota (JP)

(72) Inventors: Kei Kosaka, Tokyo (JP); Hironori Aokage, Nagoya (JP); Tatsuya Maemura, Nisshin (JP); Ryosuke Matsuoka, Nishinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/912,601

(22) Filed: Oct. 11, 2024

(65) Prior Publication Data

US 2025/0133288 A1 Apr. 24, 2025

(30) Foreign Application Priority Data

Oct. 24, 2023 (JP) ................................ 2023-182409

(51) Int. Cl.
*H04N 23/65* (2023.01)

(52) U.S. Cl.
CPC ................................ *H04N 23/651* (2023.01)

(58) Field of Classification Search
CPC ....... H04N 23/60; H04N 23/65; H04N 23/651
USPC .......................................................... 348/372
See application file for complete search history.

(56) References Cited

U.S. PATENT DOCUMENTS 8,935,045 B2 * 1/2015 Kim ...................... G01D 9/005 340/436
11,134,407 B2 * 9/2021 Hayashida ............. H04W 4/44
11,436,844 B2 * 9/2022 Carruthers ............ H04N 7/181
11,482,866 B2 * 10/2022 Nishida ..................... H02J 7/42
12,020,514 B2 * 6/2024 Tsuchiya ............... B60L 53/305
12,293,613 B2 * 5/2025 Vemuri ................. G06F 9/5094
12,384,222 B1 * 8/2025 Sorenson ........... B60H 1/00792
12,549,848 B2 * 2/2026 Yang ...................... A42B 3/042
2012/0109407 A1 * 5/2012 Yousefi ................ H04L 47/821 701/1
2012/0303215 A1 * 11/2012 Kim ...................... B62D 41/00 701/36
2017/0111587 A1 * 4/2017 Herbst ...................... B60R 1/29
2018/0213420 A1 * 7/2018 Simsek .................. H04L 67/12
2019/0066403 A1 * 2/2019 Nagura .................. G07C 5/085
2019/0165433 A1 * 5/2019 Shiraishi ............. H01M 10/425
2020/0130669 A1 * 4/2020 Tsuchiya ................ H04W 4/48
2020/0344634 A1 * 10/2020 Hayashida ............. H04W 4/44
2021/0057924 A1 * 2/2021 Nishida ..................... H02J 7/42
2021/0096559 A1 4/2021 Diamond
2021/0097315 A1 * 4/2021 Carruthers ....... G08B 13/19645

(Continued)

FOREIGN PATENT DOCUMENTS

JP 2018-016138 A 2/2018
KR 10-2018-0045211 A 5/2018

*Primary Examiner* — Pritham D Prabhakher
(74) *Attorney, Agent, or Firm* — SoraIP, Inc.

(57) ABSTRACT

The information processing device is an information processing device that controls transmission of captured data captured by an in-vehicle camera mounted on a vehicle from a vehicle to a predetermined device, and includes a control unit configured to, when the transmission of the captured data is being performed during a parking operation of the vehicle, determine a timing to stop the transmission of the captured data to the predetermined device according to remaining power of a driving battery mounted on the vehicle.

3 Claims, 5 Drawing Sheets

(56) References Cited

U.S. PATENT DOCUMENTS

| | | | | |
|---|---|---|---|---|
| 2021/0206289 | A1* | 7/2021 | Otaka | H04W 52/0261 |
| 2021/0279973 | A1* | 9/2021 | Nagata | H04W 36/0055 |
| 2022/0392270 | A1* | 12/2022 | Tsuchiya | B60L 53/305 |
| 2023/0415839 | A1* | 12/2023 | Ozaki | B62M 6/45 |
| 2024/0031905 | A1* | 1/2024 | Ikushima | H04W 52/0241 |
| 2024/0097471 | A1* | 3/2024 | Karol | H02J 7/933 |
| 2024/0104978 | A1* | 3/2024 | Moran | G07C 5/085 |
| 2024/0389701 | A1* | 11/2024 | Yang | A42B 3/042 |

* cited by examiner

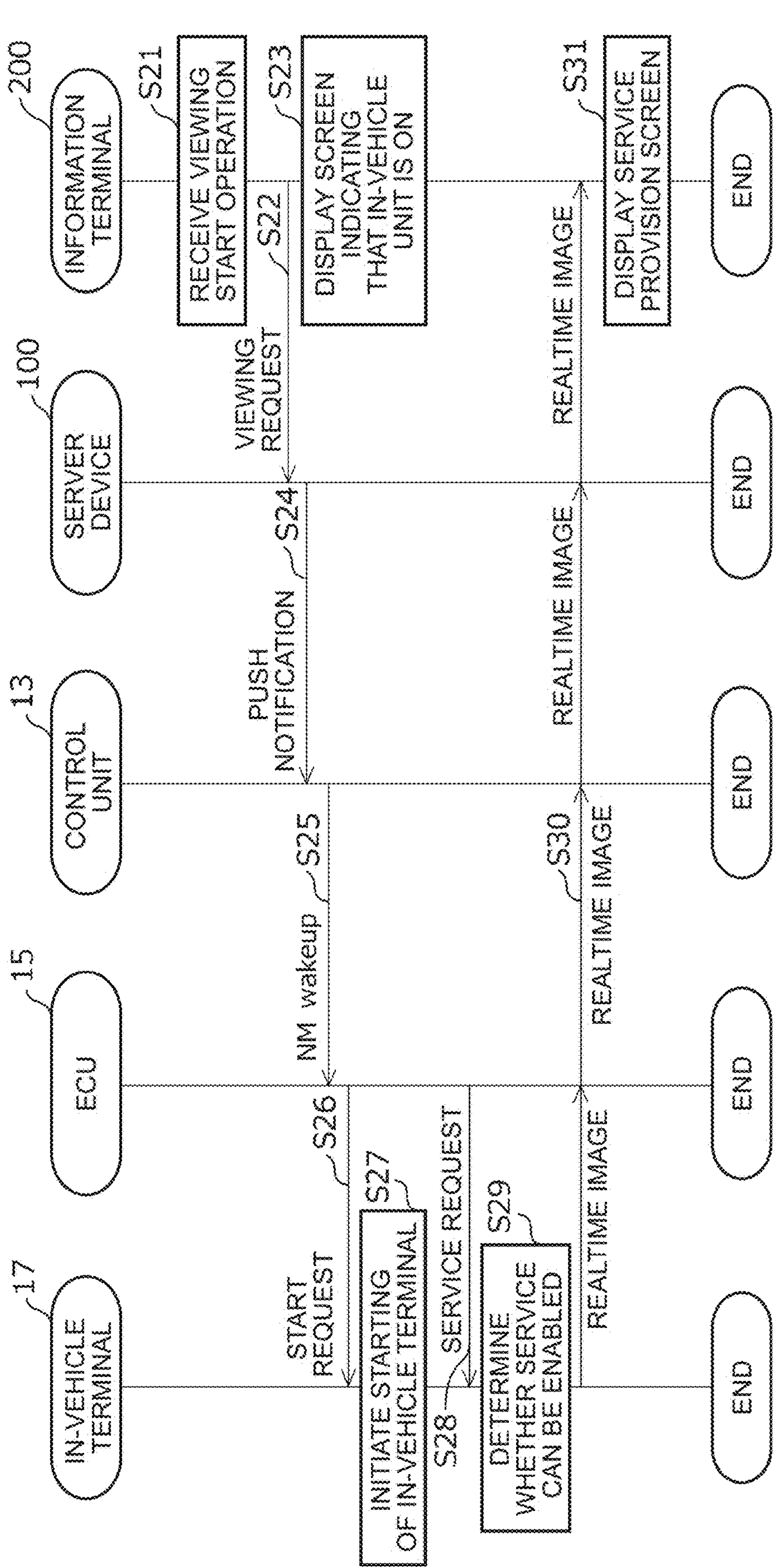
FIG. 4
IN-VEHICLE TERMINAL
17
ECU
15
CONTROL UNIT
13
SERVER DEVICE
100
INFORMATION TERMINAL
200
S21
RECEIVE VIEWING START OPERATION
S22
VIEWING REQUEST
S23
DISPLAY SCREEN INDICATING THAT IN-VEHICLE UNIT IS ON
S24
PUSH NOTIFICATION
S25
NM wakeup
S26
START REQUEST
S27
INITIATE STARTING OF IN-VEHICLE TERMINAL
S28
SERVICE REQUEST
S29
DETERMINE WHETHER SERVICE CAN BE ENABLED
REALTIME IMAGE
S30
REALTIME IMAGE
REALTIME IMAGE
REALTIME IMAGE
REALTIME IMAGE
S31
DISPLAY SERVICE PROVISION SCREEN
END
END
END
END
END START
S40
HAS DATA TRANSMISSION TIME OR TRANSMITTED DATA AMOUNT REACHED FIRST TIME LENGTH OF FIRST DATA AMOUNT?
NO
YES
S41
SEND STOP INSTRUCTION TO STOP DATA TRANSMISSION
S42
NOTIFY END OF VIEWING
END START
S50
PREDETERMINED EVENT DETECTED?
NO
YES
S51
INCREASE FIRST TIME LENGTH OR FIRST DATA AMOUNT COMPARED TO CASE WHERE PREDETERMINED EVENT IS NOT DETECTED
END

INFORMATION PROCESSING DEVICE

CROSS-REFERENCE TO RELATED APPLICATION

This application claims priority to Japanese Patent Application No. 2023-182409 filed on Oct. 24, 2023, incorporated herein by reference in its entirety.

BACKGROUND

1. Technical Field

The present disclosure relates to monitoring of a vehicle.

2. Description of Related Art

Many techniques for monitoring a vehicle are known in the art. In this regard, for example, Japanese Unexamined Patent Application Publication No. 2018-16138 (JP 2018-16138 A) discloses a unit that allows, during a parking operation of a vehicle, a user to select a monitoring function to perform normal recording and a function to start monitoring when an impact is detected and to select to turn off the monitoring function.

SUMMARY

An object of the present disclosure is to reduce power consumption of a battery of a vehicle while monitoring the vehicle during a parking operation.

According to an aspect of an embodiment of the present disclosure, an information processing device that controls transmission of captured data captured by an in-vehicle camera mounted on a vehicle from the vehicle to a predetermined device includes a control unit.

When the transmission of the captured data is being performed during a parking operation of the vehicle, the control unit determines a timing to stop the transmission of the captured data to the predetermined device according to remaining power of a driving battery mounted on the vehicle.

Other aspects include a method that is performed by the above device, a program for causing a computer to perform the method, and a computer-readable storage medium storing the program in a non-transitory manner.

The present disclosure can reduce power consumption of a battery of a vehicle while monitoring the vehicle during a parking operation.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 4 is a sequence diagram of processing executed by the system according to the embodiment;

DETAILED DESCRIPTION OF EMBODIMENTS

Figure 1:
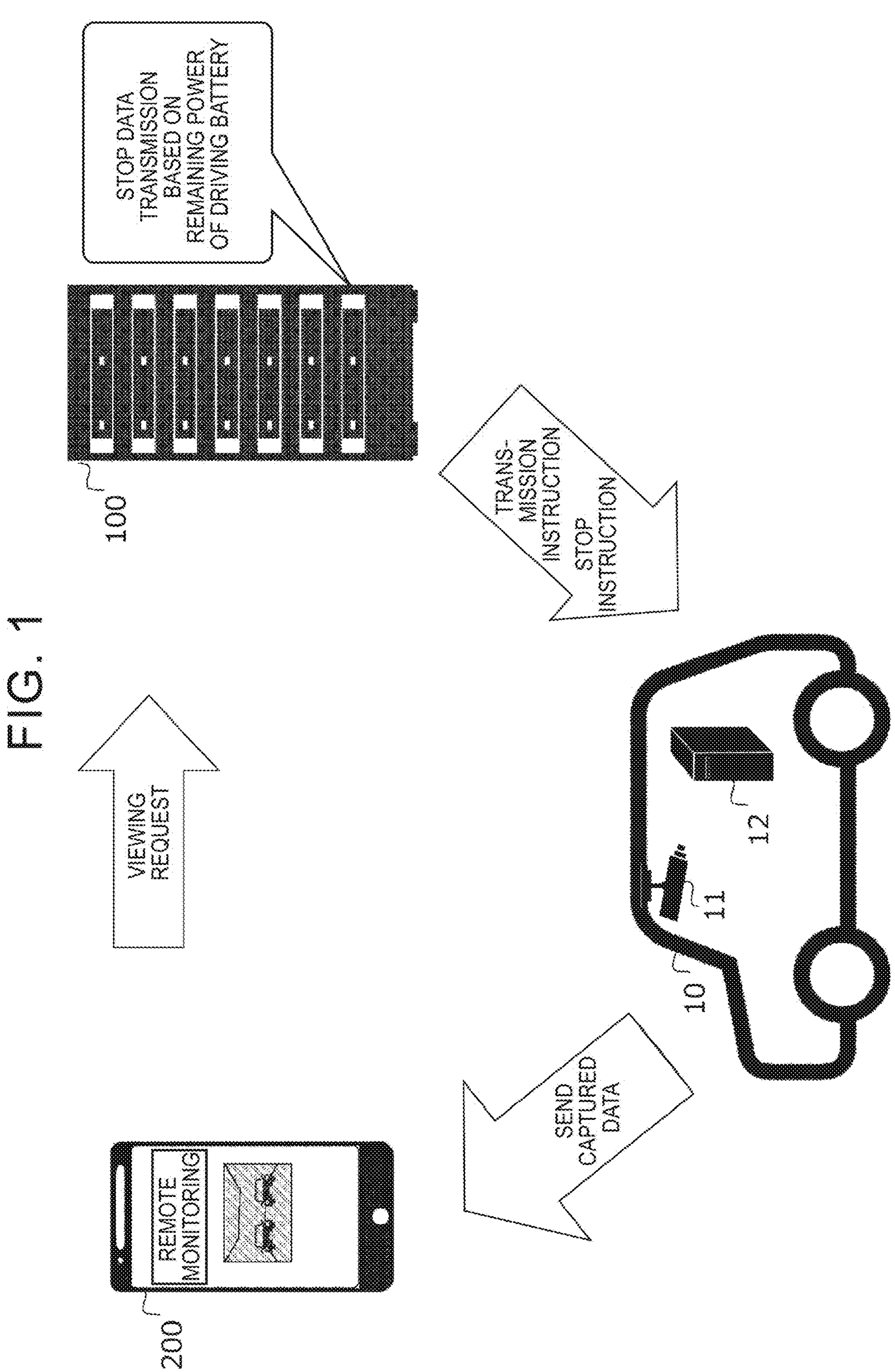
FIG. 1 is a diagram illustrating an outline of processing executed by a server device according to an embodiment.

Systems for monitoring vehicles are known.

For example, a system that transmits an image of an in-vehicle camera that monitors a vehicle to user equipment is considered. First, the system receives a video viewing request of an in-vehicle camera from user equipment. Then, the system transmits the video of the in-vehicle camera to the user equipment or the like. At this time, the communication device and the control device that transmit the video of the in-vehicle camera operate by using the electric power of the driving battery mounted on the vehicle.

However, the remaining power of the driving battery mounted on the vehicle is not always sufficient. In addition, if the video of the in-vehicle camera is provided to the user equipment without limitation, a large amount of power of the driving battery is consumed, which may affect the driving of the vehicle thereafter.

In order to cope with such a problem, it is preferable that the system transmits the image of the in-vehicle camera to the user equipment by using the electric power of the driving battery within a range that does not affect the traveling of the vehicle.

The information processing device according to the present embodiment solves such a problem.

An information processing device according to one aspect of the present disclosure is

- an information processing device configured to control transmission of captured data captured by an in-vehicle camera mounted on a vehicle from the vehicle to a predetermined device. The information processing device includes a control unit configured to, when the transmission of the captured data is being performed during a parking operation of the vehicle, determine a timing to stop the transmission of the captured data to the predetermined device according to remaining power of a driving battery mounted on the vehicle.

The in-vehicle camera is typically a camera that captures an image to be recorded on a drive recorder mounted on a vehicle. A plurality of in-vehicle cameras may be mounted on the vehicle.

The driving battery is a storage battery for supplying electric power necessary for the vehicle to travel. The driving battery may be a battery mounted on a Electric Vehicle (EV) or the like and having a capacity capable of covering all of the traveling of the vehicle, or may be a battery mounted on a conventional vehicle or the like and having a capacity capable of covering power used for a part of control required for the traveling of the vehicle.

The control unit determines the timing of stopping the transmission of the captured data to the predetermined device in accordance with the remaining power amount of the driving battery. Therefore, the control unit can round up the transmission of the captured data to a predetermined device so that the power consumption falls within the range of the available power amount.

Accordingly, the information processing device according to the present disclosure can avoid the influence on the traveling of the vehicle by consuming a large amount of electric power of the driving battery when the user monitors the vehicle using the in-vehicle camera.

The control unit may further instruct the vehicle to perform the transmission of the captured data of the in-vehicle camera to the predetermined device, in response to a viewing request sent from user equipment to view the captured data. When a transmission duration or a transmitted data amount of the captured data transmitted in response to the viewing request reaches a first time length or a first data amount, the control unit may stop the transmission of the captured data to the predetermined device and notify the user equipment of end of viewing, the first time length or the first data amount being determined based on the remaining power of the driving battery.

As a result, the information processing device according to the present disclosure can stop transmission according to the actual transmission duration or the transmitted data amount, and thus can round up the transmission of the captured data to a predetermined device so that the power consumption can be reliably within the range of the available power amount.

The control unit may determine the first time length or the first data amount based on an amount of power allocated for the transmission of the captured data out of the remaining power of the driving battery.

Accordingly, the information processing device according to the present disclosure can appropriately determine the first time length or the first data amount.

In addition, the control unit may increase the first time length or the first data amount by a predetermined amount compared to a case where the predetermined event is not detected when the predetermined event is detected.

The predetermined event is, for example, an event that occurs when the vehicle detects an impact, a suspicious person, or the like. In such a case, it is preferable to increase the first time length or the first data amount in order to alleviate the restriction of the viewing time and the like.

Accordingly, the information processing device according to the present disclosure can appropriately provide an image to a user in a scene in which viewing of captured data of an in-vehicle camera is required.

When the transmission duration or the transmitted data amount in the transmission of the captured data to the predetermined device reaches a second time length or a second data amount, the control unit may notify the user equipment that the end of the viewing is near, the second time length being shorter than the first time length, and the second data amount being smaller than the first data amount.

Thus, the information processing device according to the present disclosure can notify the user of the end of viewing in advance.

Hereinafter, embodiments of the present disclosure will be described with reference to the drawings. A hardware configuration, a module configuration, a functional configuration, etc., described in each embodiment are not intended to limit the technical scope of the disclosure to them only unless otherwise stated.

EMBODIMENT

An outline of processing performed by the server device according to the embodiment will be described with reference to FIG. 1. FIG. 1 is a diagram illustrating an outline of processing executed by a server device 100 according to an embodiment. Here, the server device 100 is an example of an information processing device according to the present disclosure. The server device 100 is a device that causes the communication unit 12 of the vehicle 10 to transmit the captured data captured by the in-vehicle camera 11 to the information terminal 200 associated with the user. The server device 100 is configured to be able to communicate with the vehicle 10.

First, the user transmits a viewing request from the information terminal 200 to the server device 100. When receiving the viewing request from the information terminal 200, the server device 100 transmits a transmission instruction to the control unit 13 of the vehicle 10.

Upon receiving the transmission instruction, the control unit 13 of the vehicle 10 transmits the captured data captured by the in-vehicle camera 11 to the information terminal 200. Note that the vehicle 10 may directly transmit the captured data to the information terminal 200 or may transmit the captured data via the server device 100.

Further, the server device 100 transmits a transmission instruction to the vehicle 10, and then acquires the remaining power of the driving battery 14 mounted on the vehicle 10. Then, the server device 100 transmits a stop instruction to the control unit 13 of the vehicle 10 at a timing determined based on the acquired remaining power amount. Upon receiving the stop instruction, the control unit 13 of the vehicle 10 stops the transmission of the captured data captured by the in-vehicle camera 11 to the information terminal 200.

As described above, the server device 100 causes the vehicle 10 to stop the transmission of the captured data of the in-vehicle camera 11 to the information terminal 200 in accordance with the remaining power of the driving battery 14. As a result, the server device 100 can avoid that the power of the driving battery 14 is consumed in a large amount when the vehicle is monitored using the in-vehicle camera 11, and the vehicle traveling is affected.

According to this configuration, the server device 100 can reduce power consumption of the battery of the vehicle while monitoring the vehicle during a parking operation.

Figure 2:
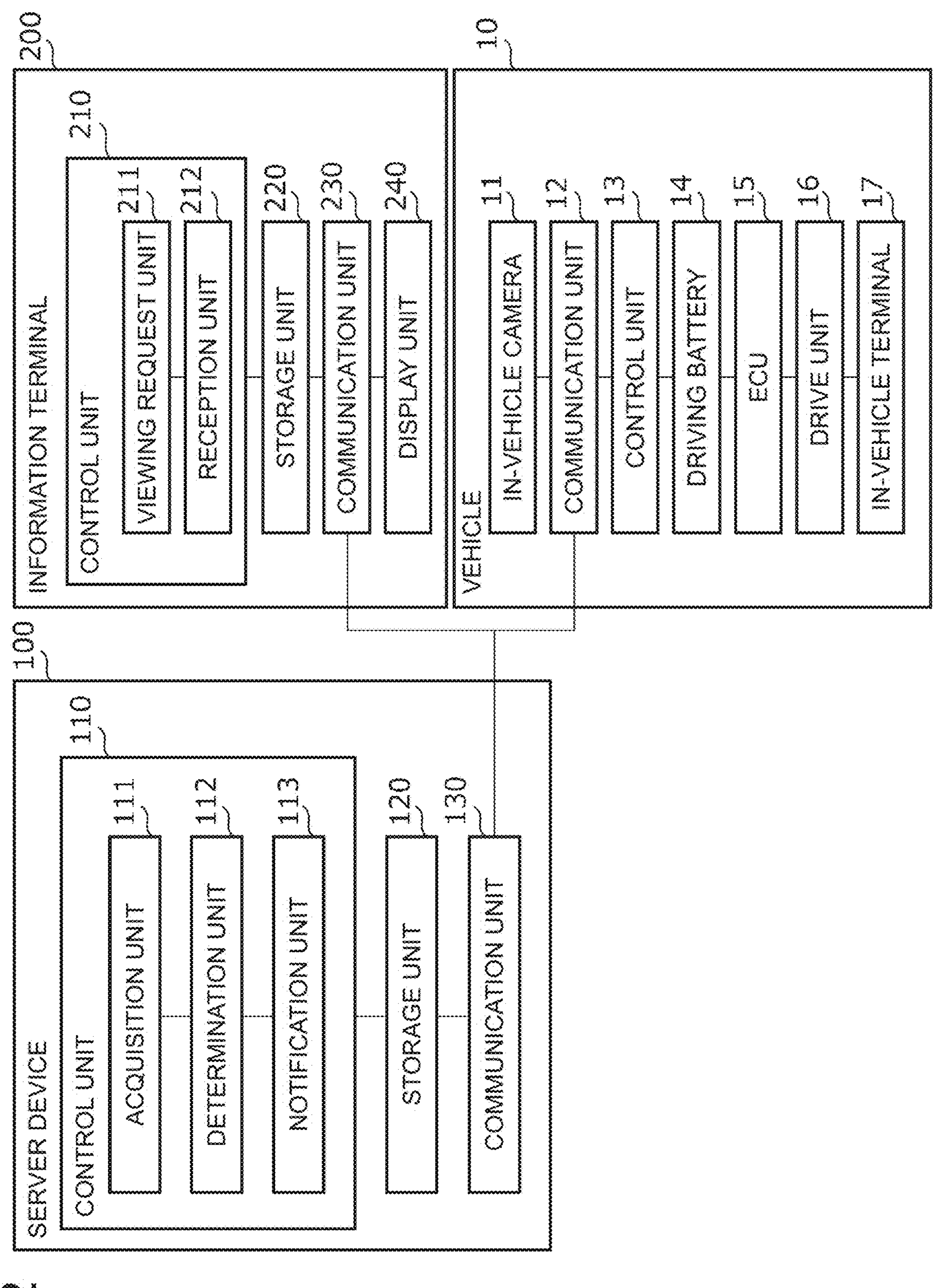
FIG. 2 is a diagram illustrating components of a system including a server device according to an embodiment.

Next, each element constituting the system will be described in detail. FIG. 2 is a diagram illustrating components of the system according to the embodiment. The system includes a server device 100, an information terminal 200, and a vehicle 10.

The server device 100 according to the present embodiment includes a control unit 110, a storage unit 120, and a communication unit 130.

The control unit 110 is implemented by a processor such as a Central Processing Unit (CPU) or a Graphics Processing Unit (GPU) and a memory. The control unit 110 includes an acquisition unit 111, a determination unit 112, and a notification unit 113 as functional modules. These functional modules may be realized by executing a program by the control unit 110.

The acquisition unit 111 acquires a viewing request transmitted from the information terminal 200. The viewing request is information transmitted from the information terminal 200 in order for the user to request the server device 100 to view the captured data captured by the in-vehicle camera 11.

The determination unit 112 transmits a transmission instruction instructing the in-vehicle camera 11 and the control unit 13 of the vehicle 10 to transmit the video of the in-vehicle camera 11 to the information terminal 200.

In addition, the determination unit 112 determines the timing of stopping the transmission of the captured data to the predetermined device in accordance with the remaining power amount of the driving battery 14 mounted on the vehicle 10. Specifically, the determination unit 112 may determine to stop the transmission of the captured data to the predetermined device when the transmission duration or the transmitted data amount of the captured data reaches the first time length or the first data amount determined based on the remaining power amount of the driving battery 14. The determination unit 112 may determine the value of the first time length or the first data amount based on the remaining power amount of the driving battery 14.

When the determination unit 112 determines to stop the transmission of the captured data to the predetermined device, the determination unit 112 transmits a stop instruction instructing the in-vehicle camera 11 and the control unit 13 of the vehicle 10 to stop the transmission of the video of the in-vehicle camera 11 to the information terminal 200.

Note that the determination unit 112 may increase the first time length or the first data amount by a predetermined amount as compared with a case where a predetermined event is not detected when a predetermined event is detected.

The notification unit 113 notifies the information terminal 200 of the end of viewing at a timing when the determination unit 112 determines to stop the transmission of the captured data to the predetermined device. In addition, the notification unit 113 notifies the information terminal 200 that the end of viewing is near when the transmission duration or the transmitted data amount in the transmission of the captured data to the predetermined device reaches the second time length or the second data amount. Here, the second time length is a time length shorter than the first time length, and the second data amount is a data amount smaller than the first data amount.

The storage unit 120 is an auxiliary storage device such as a main storage device such as a RAM or a ROM, an EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 120 stores data or the like used or generated in processing performed by the control unit 110. Further, the storage unit 120 may temporarily store the viewing request received from the information terminal 200.

The communication unit 130 includes a communication circuit that performs wireless communication. The communication unit 130 may be, for example, a communication circuit that performs wireless communication using 4th Generation (4G) or a communication circuit that performs wireless communication using 5th Generation (5G). The communication unit 130 may be a communication circuit that performs radio communication using Long Term Evolution (LTE) or a communication circuit that performs communication using Low Power Wide Area (LPWA). Further, the communication unit 130 may be a communication circuit that performs radio communication using Wi-Fi (registered trademark).

Next, a device other than the server device 100 will be described. The information terminal 200 is a terminal used by a user to transmit a viewing request, receive a video of the in-vehicle camera 11, and view the video. The information terminal 200 is a specific example of the user equipment. The information terminal 200 may be, for example, a smartphone, a tablet terminal, or a personal computer. The information terminal 200 includes a control unit 210, a storage unit 220, a communication unit 230, and a display unit 240.

The control unit 210 controls a video request process and a video reception process performed by the information terminal 200. The control unit 210 includes a viewing request unit 211 and a reception unit 212 as software modules. The viewing request unit 211 transmits a viewing request to the server device 100. Here, the viewing request is information requesting viewing of the video of the in-vehicle camera 11. The viewing request unit 211 communicates with the server device 100 via the communication unit 230, and transmits a viewing request to the server device 100.

The reception unit 212 receives an image captured by the in-vehicle camera 11 from the in-vehicle camera 11 of the vehicle 10. The reception unit 212 communicates with the in-vehicle camera 11 of the vehicle 10 via the communication unit 230, and receives the video.

The storage unit 220 is an auxiliary storage device such as a main storage device such as a RAM or a ROM, an EPROM, a hard disk drive, and a removable medium. The secondary storage device stores an operating system (OS), various programs, various tables, and the like, and by executing the programs stored therein, it is possible to realize the respective functions matching the predetermined objectives of the respective units of the control unit 110. However, some or all of the functions may be implemented by a hardware circuit such as an ASIC or an FPGA.

The storage unit 220 stores data or the like used or generated in processing performed by the control unit 210. Further, the storage unit 220 may temporarily store the video received from the in-vehicle camera 11.

The communication unit 230 includes a communication circuit that performs wireless communication. The communication unit 230 may be, for example, a communication circuit that performs wireless communication using a 4G or a communication circuit that performs wireless communication using a 5G. The communication unit 230 may be a communication circuit that performs radio communication using an LTE, or may be a communication circuit that performs communication using a LPWA. Further, the communication unit 230 may be a communication circuit that performs radio communication using Wi-Fi (registered trademark).

The display unit 240 is a display that displays the video received by the reception unit 212. The display unit 240 may be, for example, a touch panel display, a liquid crystal display, or an organic Electro-luminescence (EL) display. The vehicle 10 is, for example, a vehicle such as a passenger car. The vehicle 10 may be a conventional vehicle, an Electric Vehicle (EV) vehicle, or a hybrid electric vehicle.

The vehicle 10 includes an in-vehicle camera 11, a communication unit 12, a control unit 13, a driving battery 14, an ECU 15, and a drive unit 16.

The in-vehicle camera 11 is a camera mounted on the vehicle 10 that captures a still image or a moving image. A plurality of in-vehicle cameras 11 may be mounted on the vehicle 10. The in-vehicle camera 11 may be, for example, a camera mounted on a drive recorder.

The communication unit 12 includes a communication circuit that performs wireless communication. The communication unit 12 may be, for example, a communication circuit that performs wireless communication using a 4G or a communication circuit that performs wireless communication using a 5G. The communication unit 12 may be a communication circuit that performs radio communication using an LTE, or may be a communication circuit that performs communication using a LPWA. Further, the communication unit 12 may be a communication circuit that performs radio communication using Wi-Fi (registered trademark).

The control unit 13 controls an Electronic Control Unit (ECU) 15 or the like mounted on the vehicle 10. The control unit 13 is implemented by a processor such as a CPU or a GPU and memories. The control unit 13 may control the in-vehicle camera 11, the communication unit 12, the driving battery 14, ECU 15, and the drive unit 16 by executing the program. Upon receiving the transmission instruction, the control unit 13 transmits the captured data captured by the in-vehicle camera 11 to the information terminal 200. Further, upon receiving the stop instruction, the control unit 13 stops the transmission of the captured data captured by the in-vehicle camera 11 to the information terminal 200.

The driving battery 14 is a storage battery mounted on the vehicle 10. The driving battery 14 may be a lithium-ion battery, a lead-acid battery, a nickel-hydrogen battery, or an all-solid-state battery. The driving battery 14 may cover all of the electric power required when the vehicle 10 is driven only by electricity, or may cover the electric power used for controlling a part of the vehicle 10 that is driven by fuel such as gasoline.

ECU 15 is an electronic control unit that is a computer for realizing various functions required for traveling of the vehicle 10. A plurality of ECU 15 may be mounted. For example, ECU 15 may acquire the remaining power of the driving battery 14 and transmit the remaining power to the server device 100. ECU 15 may acquire information detected by a sensor mounted on the vehicle 10 and transmit the information to the server device 100.

The drive unit 16 is a means for causing the vehicle 10 to travel. The drive unit 16 may include, for example, a motor, an inverter, a brake, and a steering mechanism for driving wheels. The drive unit 16 may be operated by electric power supplied from the driving battery 14.

The in-vehicle terminal 17 is a terminal that displays an image of the in-vehicle camera 11 on a display unit of the in-vehicle terminal 17 or transmits an image of the in-vehicle camera 11 to the outside. The in-vehicle terminal 17 may receive an operation from a user of the vehicle 10 and display an image of the in-vehicle camera 11, a road map, a route guidance, or the like. The in-vehicle terminal 17 may be, for example, a car navigation system.

Figure 3:
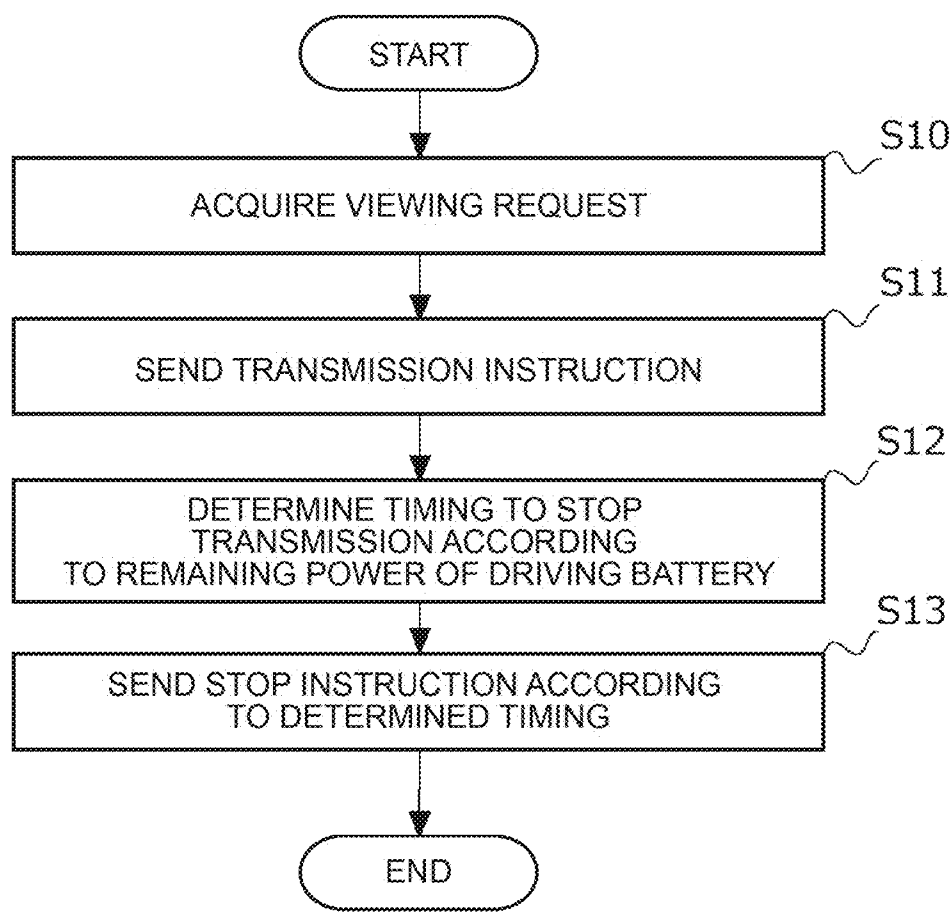
FIG. 3 is a flowchart of processing executed by a control unit of the server device according to the embodiment.

Next, specific contents of the processing performed by the server device 100 will be described. FIG. 3 is a flowchart of processing executed by the control unit 110 of the server device 100 according to the embodiment.

For example, the server device 100 may start the processing illustrated in FIG. 3 when the ignition switch of the vehicle 10 is turned off.

First, in S10, the acquisition unit 111 obtains a viewing request from the viewing request unit 211 of the information terminal 200. The acquisition unit 111 communicates with the communication unit 230 of the information terminal 200 via the communication unit 130, and acquires the viewing request transmitted by the viewing request unit 211.

Next, in S11, the determination unit 112 transmits a transmitting instruction to the control unit 13 of the vehicle 10. Here, the transmission instruction is information instructing the control unit 13 of the vehicle 10 and the in-vehicle camera 11 to transmit the video of the in-vehicle camera 11 to the information terminal 200 in response to the viewing request.

Next, in S12, the determination unit 112 determines the timing of stopping the transmission of the video of the in-vehicle camera 11 to the information terminal 200 in accordance with the remaining power of the driving battery 14. The determination unit 112 may receive, from ECU 15, information about the remaining power of the driving battery 14 and determine the timing of stopping the transmission.

Specifically, the determination unit 112 may determine the first time length or the first data amount, which is the transmission duration or transmitted data amount of the video of the in-vehicle camera 11, in accordance with the amount allocated to the transmission of the video of the in-vehicle camera 11 among the remaining power amounts of the driving battery 14. When the transmission duration or transmitted data amount of the video of the in-vehicle camera 11 reaches the first time length or the first data amount, it may be determined to stop the transmission of the video of the in-vehicle camera 11.

Next, in S13, the determination unit 112 transmits a stopping instruction corresponding to the timing determined by S12 to the control unit 13 of the vehicle 10 and the in-vehicle camera 11. Here, the stop instruction is information instructing the control unit 13 of the vehicle 10 and the in-vehicle camera 11 to stop the transmission of the video of the in-vehicle camera 11 to the information terminal 200 at a predetermined timing.

Accordingly, the server device 100 can determine the timing at which the vehicle 10 stops transmitting the captured data of the in-vehicle camera 11 to the information terminal 200 in accordance with the remaining power amount of the driving battery 14. That is, the server device 100 can transmit the captured data of the in-vehicle camera 11 to the information terminal 200 using only the power within the allowable range of the capacity of the driving battery 14. Therefore, the server device 100 can prevent the power of the driving battery 14 from being consumed in a large amount in the monitoring of the vehicle 10 using the in-vehicle camera 11, which affects the traveling of the vehicle 10.

Next, processing executed by the system including the server device 100 will be described. FIG. 4 is a sequence diagram of processing executed by the system according to the embodiment.

First, the information terminal 200 and ECU 15 are powered off. For example, the in-vehicle terminal 17 and ECU 15 have the main power turned off. Here, the in-vehicle terminal 17 is a terminal mounted on the vehicle 10 that displays or transmits an image of the in-vehicle camera 11. Here, ECU 15 is an electronic control unit that is a computer that electronically controls the traveling of the vehicle 10.

Next, in S21, the information terminal 200 receives an operation for starting the browsing, which is performed by the user. For example, the information terminal 200 detects that an icon for starting browsing, which is displayed on the display unit 240 of the information terminal 200, is pressed.

Next, in S22, the information terminal 200 transmits a viewing request to the server device 100. Here, the viewing request is a signal for causing the server device 100 to transmit a trigger for starting the processing performed by the server device 100 to the control unit 13 mounted on the vehicle 10. Here, the vehicle 10 may typically receive a viewing request via the communication unit 12, which is a DCM. The information terminal 200 may communicate with the server device 100 via a wide area network such as the Internet.

Next, in S23, the information terminal 200 displays a window indicating that the in-vehicle terminal 17 is being activated on the display unit 240. The screen indicating that the in-vehicle terminal 17 is being activated includes a screen indicating a state in which the in-vehicle terminal 17 is waiting for activation.

Next, in S24, the server device 100 transmits a signal for activating the in-vehicle terminal 17 (and the in-vehicle camera 11) to the control unit 13. This may be transmitted via a push notification according to a predetermined Application Programming Interface (API).

Next, in S25, the control unit 13 transmits to ECU 15 a Controller Area Network (CAN) wakeup in the communication protocol. Wakeup may be transmitted by a Network Management (NM).

Next, in S26, ECU 15 transmits an activation request to the in-vehicle terminal 17. Here, the activation request is a signal for causing the in-vehicle terminal 17 to activate its own device. At the same time, ECU 15 activates DC-DC converters of the vehicle 10 and starts supplying power to the in-vehicle terminal 17 and the in-vehicle camera 11.

Upon receiving the activation request, the in-vehicle terminal 17 starts the activation in S27. As a result, the in-vehicle terminal 17 is turned on.

Next, in S28, the in-vehicle terminal 17 receives a service-request from ECU 15. Here, the service request is an instruction for requesting the in-vehicle terminal 17 to acquire the captured data captured by the in-vehicle camera 11 and transmit the acquired captured data to the server device 100.

Next, in S29, the in-vehicle terminal 17 determines whether or not the service provided by the in-vehicle terminal 17 can be activated. Here, the service provided by the in-vehicle terminal 17 includes acquiring captured data captured by the in-vehicle camera 11 and transmitting the captured data captured by the in-vehicle camera 11 to the server device 100.

Next, in S30, the in-vehicle terminal 17 transmits the real-time video captured by the in-vehicle camera 11 (hereinafter, referred to as real-time video) to the server device 100, and the server device 100 provides this to the information terminal 200. Specifically, the in-vehicle terminal 17 may transmit the real-time video to ECU 15 on CAN network, and ECU 15 may transmit the real-time video to the server device 100 via the communication unit 12 via an external wide area network or the like.

Upon receiving the real-time video, the information terminal 200 displays a service-providing window on S31. Specifically, the information terminal 200 outputs an interface for displaying the real-time video acquired from the server device 100.

When the information terminal 200 performs an operation of ending the acquisition of the real-time video, the information terminal 200 transmits an instruction for ending the transmission of the real-time video to the server device 100. Based on this, the server device 100 transmits an instruction for terminating the transmission of the real-time video to ECU 15 via the control unit 13. ECU 15 that has received the instruction for terminating the transmission of the real-time video transmits the instruction for stopping the operation to the in-vehicle terminal 17. Upon receiving the instruction to stop the operation, the in-vehicle terminal 17 stops the operation and is in a state in which the power is turned off. Similarly, DC-DC converters that have received an instruction to stop the operation from ECU 15 stop the operation.

Figures 5, 6:
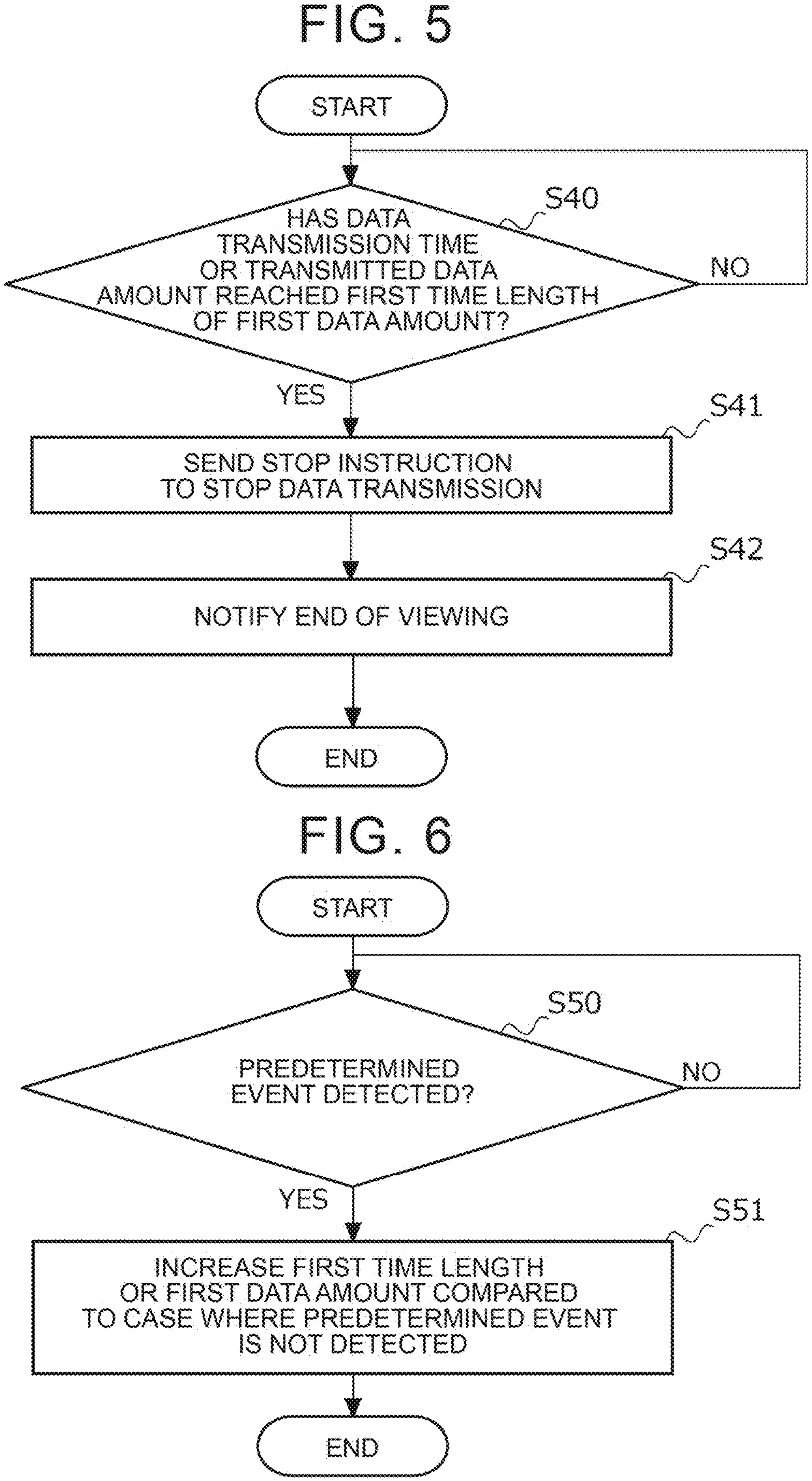
FIG. 5 is a flow chart of a process of stopping data transmission executed by a control unit of the server device according to the embodiment.
FIG. 6 is a flowchart of processing for increasing the first time length or the first data amount executed by the control unit of the server device according to the embodiment.

Next, a process in which the notification unit 113 of the control unit 110 of the server device 100 notifies the information terminal 200 of the end of viewing will be described. FIG. 5 is a flowchart of processing for stopping data transmission executed by the control unit 110 of the server device 100 according to the embodiment. The processing illustrated in FIG. 5 is a detailed description of the processing of S12 and S13 described in FIG. 3.

First, in S40, the determination unit 112 determines whether or not the data transmission time or transmitted data amount of the video of the in-vehicle camera 11 to the information terminal 200 has reached the first time length or the first data amount in response to the viewing request. In this step, when the determination unit 112 determines that the data transmission time or transmitted data amount of the video of the in-vehicle camera 11 to the information terminal 200 has reached the first time length or the first data amount in response to the viewing request, an affirmative determination is made.

If an affirmative determination is made in this step, the process transitions to S41.

If a negative determination is made in this step, the process returns to S40.

When the process transitions to S41, the determination unit 112 transmits a stop instruction, which is information for stopping transmitting the video to the information terminal 200, to the control unit 13 of the vehicle 10.

Next, in S42, the notification unit 113 notifies the information terminal 200 of the end of viewing. Note that the determination unit 112 may transmit a stop instruction to the control unit 13 and the in-vehicle camera 11 of the vehicle 10.

At this time, the information terminal 200 that has received the notification of the end of viewing may display, on the display unit 240, a notification indicating to the user that the viewing of the video of the in-vehicle camera 11 is ended.

Accordingly, the server device 100 can stop the transmission of the video of the in-vehicle camera 11 in accordance with the remaining power of the driving battery 14, and can notify the user via the information terminal 200 that the transmission of the video has been stopped.

Next, a process in which the determination unit 112 of the control unit 110 of the server device 100 increases the first time length or the first data amount when a predetermined event occurs will be described. FIG. 6 is a flowchart of processing for increasing the first time length or the first data amount executed by the control unit 110 of the server device 100 according to the embodiment. The process illustrated in FIG. 6 is an example of the process described in FIG. 3 for determining the length of the first time length or the magnitude of the first data amount determined in S12.

First, in S50, the determination unit 112 determines whether or not a predetermined event has been detected. For example, the determination unit 112 determines whether or not various sensors or cameras included in the vehicle 10 have detected a predetermined event such as an impact or an approach of a suspicious person. When the determination unit 112 determines that a predetermined event has been detected, this step makes an affirmative determination.

If an affirmative determination is made in this step, the process transitions to S51.

If a negative determination is made in this step, the process returns to S50.

When the process transitions to S51, the determination unit 112 increases the first time length or the first data amount by a predetermined amount compared to when no predetermined event is detected.

Accordingly, the server device 100 can increase the transmission time or transmitted data amount of the video of the in-vehicle camera 11 when more careful monitoring of the vehicle 10 is required, such as when the impact of the vehicle 10 or when the suspicious person is detected to approach the vehicle 10.

Next, a process in which the notification unit 113 of the control unit 110 of the server device 100 announces the end of viewing to the information terminal 200 in advance will be described. Here, the process described may be performed prior to S40 described in FIG. 5.

The notification unit 113 notifies the information terminal 200 that the end of viewing is near when the transmission duration or transmitted data amount of the video of the in-vehicle camera 11 to the information terminal 200 reaches the second time length or the second data amount. Here, the second time length or the second data amount is a time length shorter than the first time length or a data amount smaller than the first data amount.

Accordingly, the server device 100 can notify the user of the end of viewing of the video before the viewing of the video of the in-vehicle camera 11 actually ends.

Modification

The above-described embodiment is merely an example, and the present disclosure may be appropriately modified and implemented without departing from the scope thereof.

For example, the processes and means described in the present disclosure can be freely combined and implemented as long as no technical contradiction occurs.

Further, the processes described as being executed by one device may be shared and executed by a plurality of devices. Alternatively, the processes described as being executed by different devices may be executed by one device. In the computer system, it is possible to flexibly change the hardware configuration (server configuration) for realizing each function.

The present disclosure can also be implemented by supplying a computer with a computer program that implements the functions described in the above embodiment, and causing one or more processors of the computer to read and execute the program. Such a computer program may be provided to the computer by a non-transitory computer-readable storage medium connectable to the system bus of the computer, or may be provided to the computer via a network. The non-transitory computer-readable storage medium is, for example, a disc of any type such as a magnetic disc (floppy (registered trademark) disc, hard disk drive (HDD), etc.), an optical disc (compact disc (CD)-read-only memory (ROM), digital versatile disc (DVD), Blu-ray disc, etc.), a ROM, a random access memory (RAM), an erasable programmable read only memory (EPROM), an electrically erasable programmable read only memory (EEPROM), a magnetic card, a flash memory, an optical card, and any type of medium suitable for storing electronic commands.

What is claimed is:

1. A server that controls transmission of captured data from a vehicle to a predetermined device, the captured data being captured by an in-vehicle camera mounted on the vehicle, the server comprising a processor configured to instruct the vehicle to transmit the captured data of the in-vehicle camera to user equipment, stop transmitting the captured data to the user equipment and notify the user equipment of end of viewing, when a transmission duration or a transmitted data amount of the captured data reaches a first time length or a first data amount, the first time length and the first data amount being determined based on remaining power of a driving battery, and in a case where the in-vehicle camera or a sensor in the vehicle detects at least one of an impact of the vehicle and an approach of a suspicious person, increase the first time length or the first data amount by a predetermined amount.

2. The server according to claim 1, wherein the processor is further configured to determine the first time length or the first data amount based on an amount of power allocated for transmitting the captured data out of the remaining power of the driving battery.

3. The server according to claim 1, wherein the processor is further configured to, when the transmission duration or the transmitted data amount in transmitting the captured data to the predetermined device reaches a second time length or a second data amount, notify the user equipment that the end of the viewing is near, the second time length being shorter than the first time length, and the second data amount being smaller than the first data amount.

* * * * *